United States Patent
Kankani et al.

(10) Patent No.: US 10,884,629 B1
(45) Date of Patent: Jan. 5, 2021

(54) SHARD REBALANCING BASED ON OVER-PROVISIONING

(71) Applicant: Facebook, Inc., Menlo Park, CA (US)

(72) Inventors: Navneeth Kankani, Fremont, CA (US); Mrinmoy Ghosh, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 35 days.

(21) Appl. No.: 16/287,181

(22) Filed: Feb. 27, 2019

(51) Int. Cl.
*G06F 12/00* (2006.01)
*G06F 3/06* (2006.01)

(52) U.S. Cl.
CPC ......... *G06F 3/0611* (2013.01); *G06F 3/067* (2013.01); *G06F 3/0631* (2013.01); *G06F 3/0647* (2013.01); *G06F 3/0653* (2013.01)

(58) Field of Classification Search
CPC .... G06F 3/0611; G06F 3/0631; G06F 3/0653; G06F 3/067
See application file for complete search history.

(56) References Cited

U.S. PATENT DOCUMENTS

| | | | |
|---|---|---|---|
| 2006/0010169 A1* | 1/2006 | Kitamura | G06F 3/0685 |
| 2011/0264843 A1* | 10/2011 | Haines | G06F 3/0616 |
| | | | 711/103 |
| 2014/0215129 A1* | 7/2014 | Kuzmin | G06F 12/0246 |
| | | | 711/103 |
| 2015/0220268 A1* | 8/2015 | Duzly | G06F 3/0643 |
| | | | 711/103 |
| 2017/0160976 A1* | 6/2017 | Thangaraj | G06F 3/0604 |

* cited by examiner

*Primary Examiner* — Arvind Talukdar
(74) *Attorney, Agent, or Firm* — Van Pelt, Yi & James LLP

(57) ABSTRACT

A performance metric of a data shard stored in a first storage portion is monitored. It is determined that the performance metric of the data shard exceeds a threshold. In response to the determination that the performance metric exceeds the threshold, the data shard is reassigned to a second storage portion selected based on an over-provisioning bias of the second storage portion that is different than an over-provisioning bias of the first storage portion or the over-provisioning bias of the first storage portion is increased.

20 Claims, 6 Drawing Sheets

US 10,884,629 B1

SHARD REBALANCING BASED ON OVER-PROVISIONING

BACKGROUND OF THE INVENTION

Data centers are facilities used to store computer systems and components, such as data storage systems and their associated components. Modern data centers are typically large facilities whose computer systems, notably data storage systems, are used to store large amounts of data. The tremendous increase in the generation and consumption of data in recent times has been a catalyst for the utilization of more and more data centers to store these vast amounts of data. Organizing, accessing, manipulating, and processing the enormous amounts of data and their redundant copies is challenging. One challenge associated with many data storage systems in data centers is achieving predictable latencies with respect to data operations (e.g., data reads and writes). Therefore, there exists a need for a way to increase the predictability of such latencies.

BRIEF DESCRIPTION OF THE DRAWINGS

Various embodiments of the invention are disclosed in the following detailed description and the accompanying drawings.

DETAILED DESCRIPTION

Figure 1:
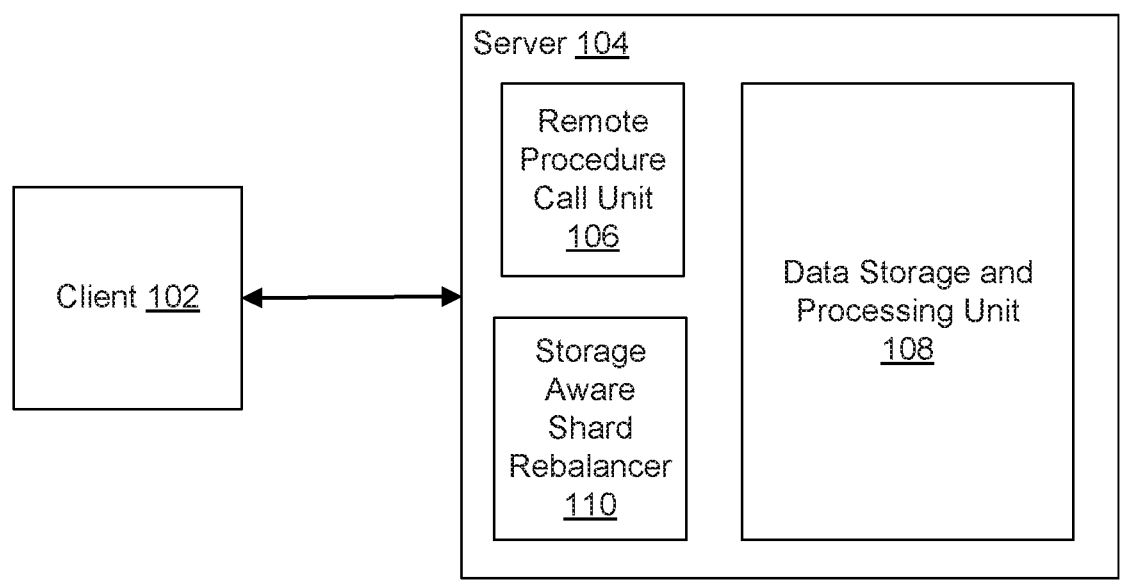
FIG. 1 is a block diagram illustrating an embodiment of a system for rebalancing shards.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Assigning shards to storage portions with different over-provisioning (OP) biases according to one or more performance metrics associated with the shards is disclosed. In various embodiments, in any particular data storage system at any particular data center, data is grouped in terms of relatively large data containers referred to as shards. Shards may comprise of individual files storing data. Examples of types of data that may be stored include text, images, audio, video, computer instructions, and any other type of data. In various embodiments, shards reside in storage portions of data storage systems. Examples of technologies used to implement storage portions include magnetic disk, optical, and solid-state drive (SSD) technologies. In some embodiments, shards reside in storage portions associated with SSDs. SSDs may use various integrated circuit architectures to store data persistently. For example, NAND-based flash memory architectures may be used to implement SSDs. The storage portions in which shards reside may be entire SSDs or portions thereof (e.g., partitions of SSDs). A particular shard may be stored on a single storage machine (e.g., computer, host, server, etc.) within a data center. A single storage machine may include a plurality of SSDs. In various embodiments, OP refers to allocating more data storage space than is strictly necessary (e.g., in a 10 gigabyte (GB) storage portion, only allocating 8 GB for actual storage of data and allocating the other 2 GB as a buffer space). SSD OP can improve SSD performance by, for example, providing additional buffer space for managing NAND write/erase cycles and increasing the rate of writes to pre-erased blocks.

In some embodiments, Non-Volatile Memory Express (NVMe) sets are the SSD storage portions in which shards reside. In various embodiments, NVMe refers to an interface specification for accessing non-volatile storage media. The NVMe interface specification can allow hardware and software to better exploit parallelism in modern SSDs, resulting in performance improvements compared to older specifications designed primarily for non-SSD technologies (e.g., magnetic disk). In various embodiments, the NVMe interface specification is used to manage storage portions associated with shard storage, wherein the storage portions are referred to as NVMe sets. NVMe sets may be comprised of a plurality of channels (e.g., 4, 8, 16, etc. channels per NVMe set). An SSD drive may be comprised of a plurality of NVMe sets (e.g., 4, 8, 16, etc.). In various embodiments, reads and writes associated with any particular NVMe set are isolated from reads and writes associated with other NVMe sets. A single storage machine (e.g., computer, host, server, etc.) within a data center may be comprised of a plurality of SSD drives.

The NVMe interface specification is used to assign and/or manage OP biases for NVMe sets, allowing for tailored placement of a shard into an NVMe set that has an OP bias suited (according to some performance metric) to that shard. Examples of performance metrics include queries per second (QPS) (read and/or write) (or queries per some other unit of time), read and/or write bandwidth, and read and/or write latencies. For example, if it is determined that QPS for a shard exceeds some threshold and/or read latency for the shard falls below some other threshold, the shard may be labeled as "hot" (e.g., indicating that the shard is a frequently accessed shard), and as such, designated for placement into an NVMe set whose OP bias is suited for a hot shard (e.g., a higher OP bias). In various embodiments, hot shards are stored in and/or placed into NVMe sets with relatively high OP biases, due in part to higher OP bias being associated with lower write amplification (WA) and reduced latency, as illustrated in the equation:

$$OP\ \% = WA * \ln\left(\frac{WA}{WA-1}\right) - 1. \qquad \text{(Equation 1)}$$

Stated alternatively, in various embodiments, hot shards are stored in and/or placed into more highly over-provisioned NVMe sets in order to reduce access latencies associated with hot shards. A practical benefit of storing more frequently accessed shards in storage portions with higher OP biases (shard rebalancing) is more predictable latency in database-centric applications on a flash-based storage system. This is due at least in part to mitigating poor tail latencies due to worst-case latencies driven by hot shards. By storing hot shards in storage portions with higher OP biases, the most unpredictable worst-case latencies are mitigated (e.g., by reducing extra writes due to defragmentation and hence reducing total write/erase cycles). A benefit of this shard rebalancing is improving the overall functional/useful life of shard storage systems and more consistent storage performance (e.g., due to reducing writes and write/erase cycles).

FIG. 1 is a block diagram illustrating an embodiment of a system for rebalancing shards. In the example shown, the system for rebalancing shards includes client 102 and server 104. Server 104 includes remote procedure call unit 106, data storage and processing unit 108, and storage aware shard rebalancer 110. Examples of client 102 include any hardware and/or software system, component, process, and/or application. In various embodiments, client 102 communicates with server 104 in order to write data to server 104, retrieve data from server 104, and/or request server 104 to process data stored on server 104. Examples of server 104 include any hardware and/or software system, component, process and/or application associated with storing data. In some embodiments, server 104 is a single computer and/or host comprised of multiple storage portions. For example, server 104 may be a single computer comprised of multiple SSDs that are used to store data, wherein each SSD is comprised of multiple NVMe sets. The data stored on server 104 may include any type of data, including text, files, images, audio, video, and computer instructions.

In the example illustrated in FIG. 1, remote procedure call unit 106 facilitates interaction between client 102 and server 104. Example implementations of remote procedure call unit 106 include any hardware and/or software system, component, process, and/or application. Remote procedure calling allows for a level of location transparency in that calls to access data stored on server 104 can remain largely the same regardless of whether the calls are local or remote. In various embodiments, client 102 sends remote requests to server 104 to execute specified procedures, server 104 sends responses to client 102, and while server 104 is processing requests, client 102 is blocked from making additional requests (except for asynchronous requests). In the example shown in FIG. 1, data storage and processing unit 108 stores and processes data residing on server 104. Data storage and processing unit 108 includes storage portions. In some embodiments, these storage portions include SSDs, wherein each SSD is comprised of a plurality of NVMe sets. In various embodiments, data storage and processing unit 108 executes procedures and/or computations on data residing in its storage portions (e.g., using hardware and/or software systems, components, processes and/or applications included within data storage and processing unit 108). In the example shown in FIG. 1, storage aware shard rebalancer 110 manages storage of shards within storage portions of data storage and processing unit 108. Example implementations of storage aware shard rebalancer 110 include any hardware and/or software system, component, process, and/or application. In various embodiments, storage aware shard rebalancer 110 determines which shards should be stored in which storage portions. Storage aware shard rebalancer 110 may determine shard temperatures (relative access frequencies associated with shards, e.g. frequently accessed shards are referred to as hot shards and infrequently accessed shards are referred to as cold shards) according to performance metrics such as QPS, read and/or write bandwidth, and read and/or write latencies associated with shards. Furthermore, based on a shard's temperature, storage aware shard rebalancer 110 can assign the shard to a storage portion with a different OP bias than the storage portion where the shard currently resides or dynamically adjust the OP bias of the storage portion where the shard currently resides.

In the example illustrated in FIG. 1, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. For example, multiple instances of data storage and processing unit 108 may exist. Client 102 and server 104 may be physically separate systems that are not necessarily located in the same geographic locations. Client 102, server 104, and other components not shown (e.g. systems, components, processes, and/or applications coordinating data transfer between client 102 and server 104) may interface with each other over a network. Examples of a network include one or more of the following: a direct or indirect physical communication connection, mobile communication network, Internet, intranet, Local Area Network, Wide Area Network, Storage Area Network, and any other form of connecting two or more systems, components, or storage devices together. The example shown in FIG. 1 has been simplified for clarity of illustration. Components not shown in FIG. 1 may also exist (e.g., systems, components, processes, and/or applications coordinating data transfer between client 102 and server 104 and/or providing database services to server 104).

Figure 2:
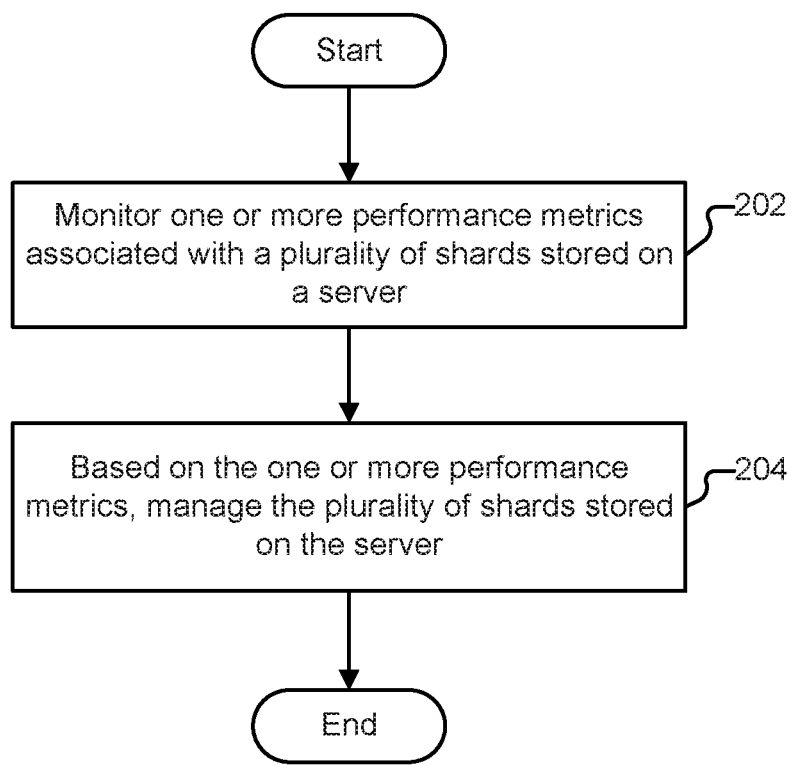
FIG. 2 is a flow chart illustrating an embodiment of a process for rebalancing shards.

FIG. 2 is a flow chart illustrating an embodiment of a process for rebalancing shards. In some embodiments, this process is performed by storage aware shard rebalancer 110 of FIG. 1.

At 202, one or more performance metrics associated with a plurality of shards stored on a server are monitored. Examples of performance metrics include QPS (read and/or write), read and/or write bandwidth, and read and/or write latencies. An example of the server on which the plurality of shards is stored is server 104 of FIG. 1. In various embodiments, asymmetricity in read and write access patterns across shards is observed. For example, QPS can vary several orders of magnitude depending on which shard is monitored. Furthermore, read bandwidth ranges can vary significantly (e.g., between P50 and P99 levels). Because performance metrics (e.g., QPS) can vary significantly, shard data temperatures (corresponding to how frequently shards are accessed, e.g. as measured by performance metrics such as QPS) can also vary significantly (ranging from cold to hot). Thresholds for shard data temperature may be specified. For example, if QPS for a shard exceeds a certain value, the shard may be designated as hot.

Figure 5:
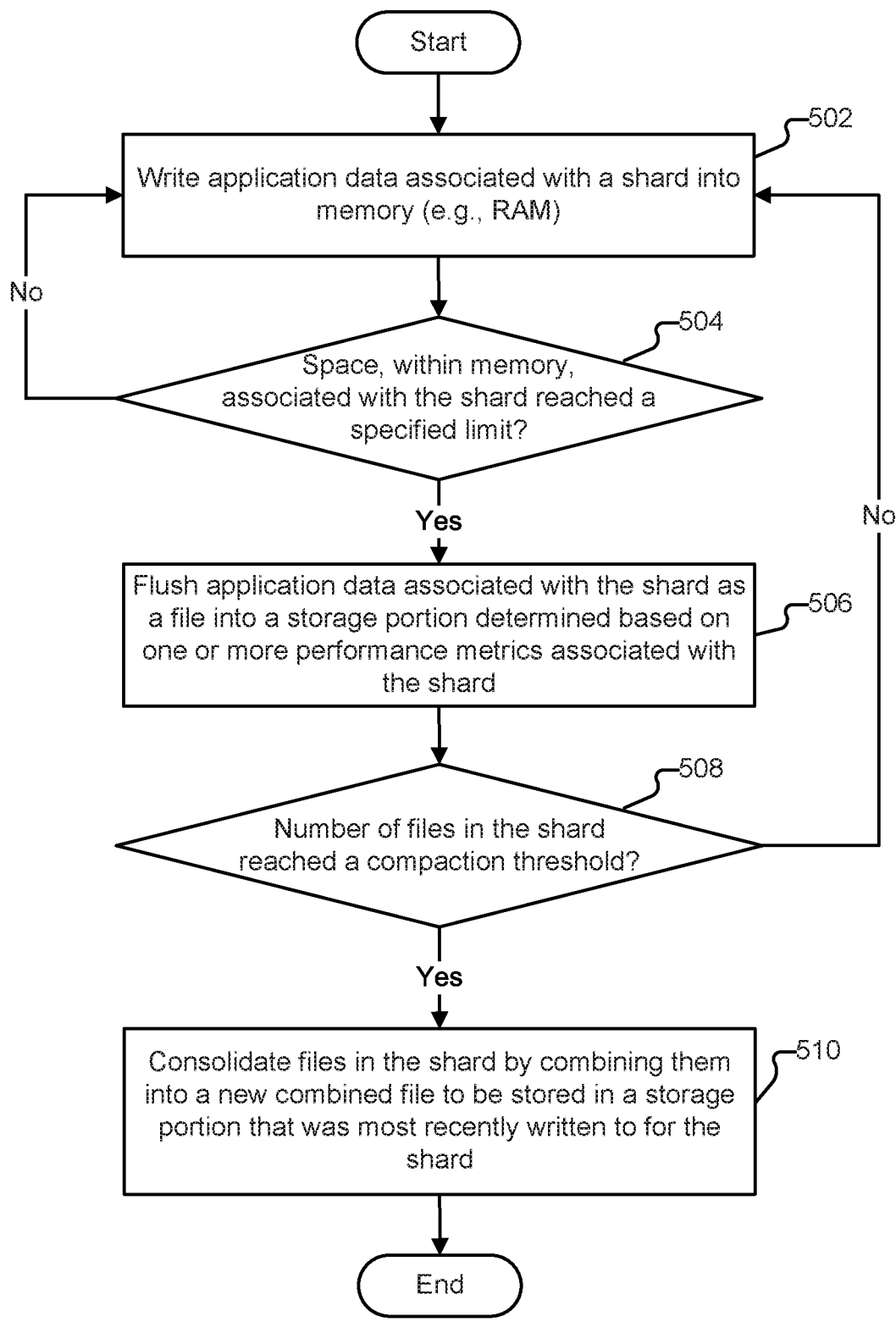
FIG. 5 is a flow chart illustrating an embodiment of a process for associating a higher OP bias with a shard.
Figure 6:
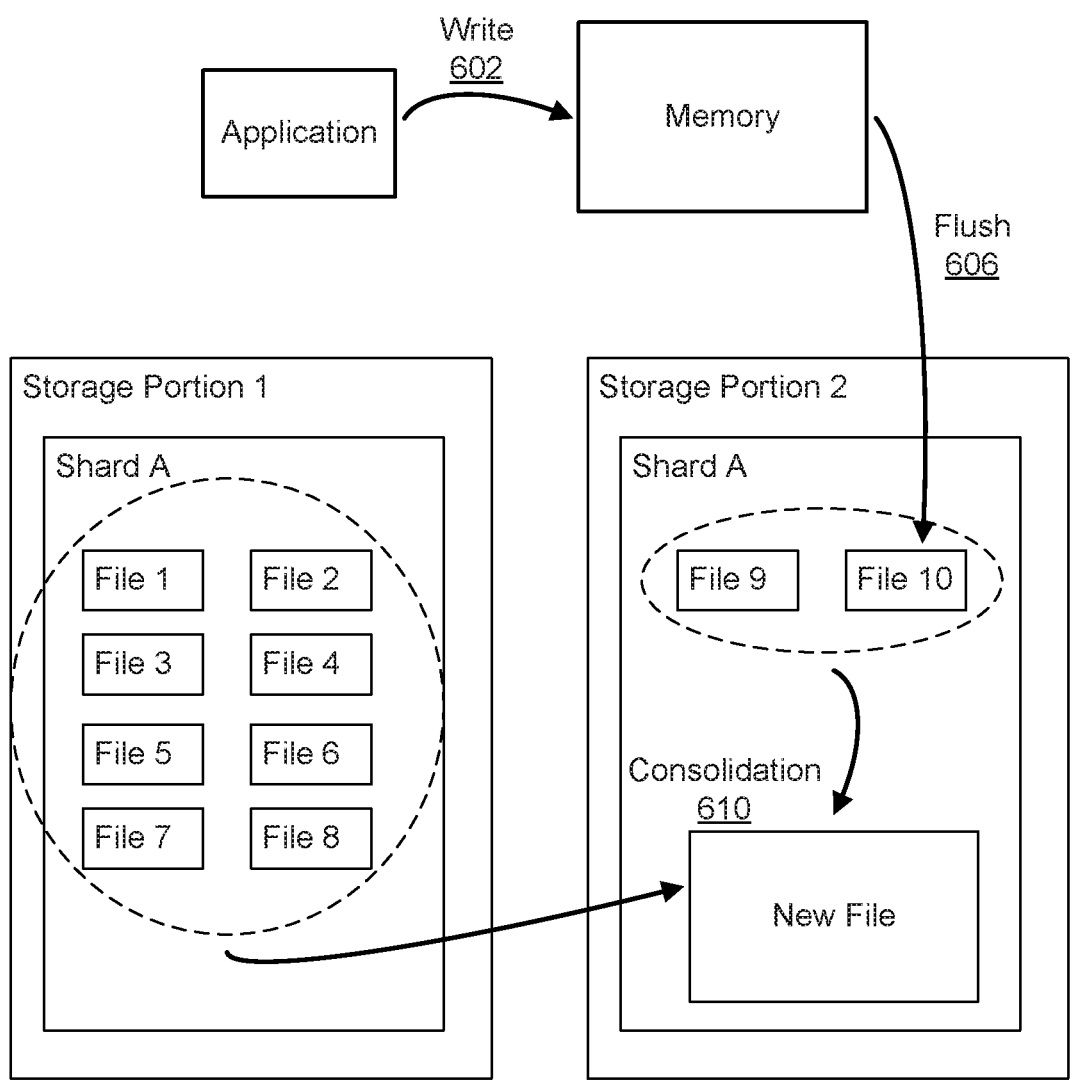
FIG. 6 is a diagram visually illustrating an example of an embodiment described with respect to the process of FIG. 5.

At 204, based on the one or more performance metrics, the plurality of shards stored on the server are managed. In some embodiments, managing shards includes rebalancing shards. In various embodiments, if a shard within the plurality of shards is determined to be hot (e.g., due to a performance metric, such as QPS, reaching some threshold), a rebalancing action is taken with respect to the shard. Examples of rebalancing actions include reassigning the shard to a storage portion with a higher OP bias or dynamically increasing the OP bias of the storage portion in which the shard is stored. For example, if a shard that is determined to be hot currently resides in an NVMe set that is not over-provisioned (e.g., a 10 GB NVMe set in which 10 GB are allocated to actual storage of data), an action that could be taken is for storage aware shard rebalancer 110 of FIG. 1 to issue an NVMe command (as already implemented in the NVMe interface specification) to re-configure the OP bias of the NVMe set (e.g., allocate 2 GB of a 10 GB NVMe set as a buffer space, assuming the 2 GB are not already occupied and are available to allocate). FIGS. 5 and 6 illustrate examples in which shards are moved from a first storage portion to a second storage portion in response to monitoring one or more performance metrics associated with shards.

Figure 3:
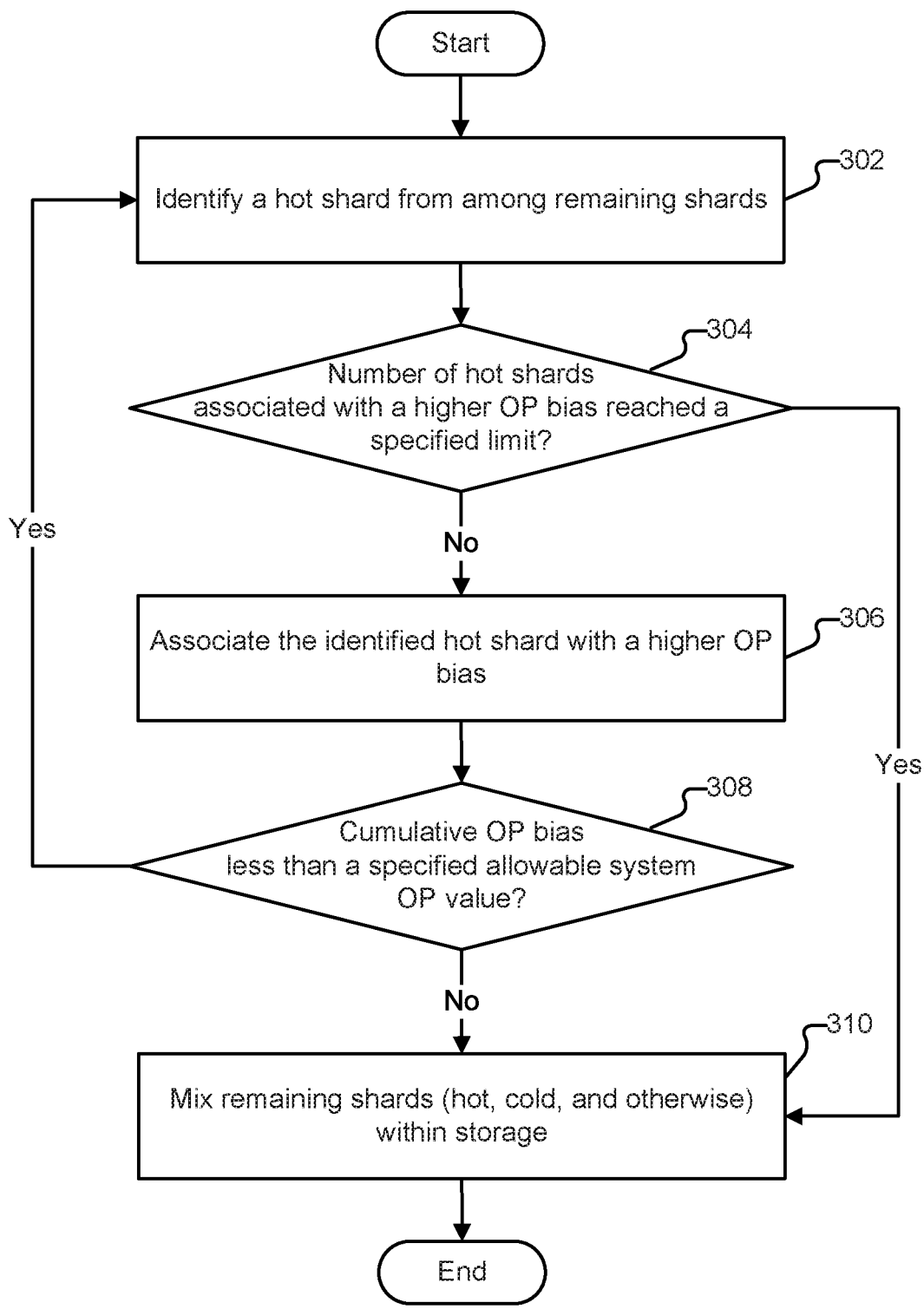
FIG. 3 is a flow chart illustrating an embodiment of a process for rebalancing shards based on over-provisioning.

FIG. 3 is a flow chart illustrating an embodiment of a process for rebalancing shards based on over-provisioning. In some embodiments, the process of FIG. 3 is performed by storage aware shard rebalancer 110 of FIG. 1. In some embodiments, at least a portion of the process of FIG. 3 is performed in 204 of FIG. 2.

At 302, a hot shard is identified from among remaining shards. The remaining shards may be comprised of shards of various temperatures (e.g., hot, cold, and in between hot and cold). Shards are identified and classified according to their data temperatures, which can be done, for example, by monitoring QPS or other performance metrics. At this point in the process of FIG. 3, a single hot shard is identified from among all of the remaining shards. In various embodiments, remaining shards refers to shards (e.g., stored on server 104 of FIG. 1) that can be reassigned to different storage portions or assigned different OP biases.

At 304, it is determined whether the number of hot shards associated with a higher OP bias has reached a specified limit. In some embodiments, preferential treatment (e.g., associating a shard with a higher OP bias) is only given to a specified number of hot shards (this specified number being a configurable parameter). For example, if 100 shards exist, in order to efficiently utilize resources, a specified number of shards (e.g., 10 hottest shards) may be associated with higher OP biases even if more than that specified number (e.g., more than 10) are considered hot (e.g., according to QPS). By doing so, resources such as cumulative OP bias (as described below) can be conserved. If at 304 it is determined that the number of hot shards associated with a higher OP bias has reached the specified limit, at 310, the remaining shards (hot, cold, and otherwise) are mixed within storage. In various embodiments, a goal of such mixing is to evenly distribute data temperatures (and hence access latencies) for the remaining shards in order to achieve more predictable latencies. Not included among the remaining shards are shards already associated with higher OP biases (e.g., at step 306). If at 304 it is determined that the number of hot shards associated with a higher OP bias has not reached the specified limit, at 306, the identified hot shard is associated with a higher OP bias (as described below).

At 306, the identified hot shard is associated with a higher OP bias. For example, if the identified hot shard resides in an NVMe set of an SSD, an NVMe command may be issued to increase the OP bias of the NVMe set in which the identified hot shard resides, which would not require reassigning and/or moving the identified hot shard to a different NVMe set. Dynamically increasing the OP bias of the NVMe set in which the identified hot shard resides may not be possible in all scenarios. For example, there may not be space in the NVMe set to achieve the desired over-provisioning (e.g., if it is desired that a 10 GB NVMe set have 2 GB over-provisioned and allocated as buffer space but 9 GB have already been used to store data, the desired over-provisioning may not be practicable). In some embodiments, associating the identified hot shard with a higher OP bias refers to and/or includes reassigning and/or moving the identified hot shard to a different storage portion whose OP bias is higher than the storage portion where the identified hot shard currently resides. For example, if the identified hot shard resides in an NVMe set of an SSD, the identified hot shard may be moved to a different NVMe set with a higher OP bias. Moving the identified hot shard may include identifying an NVMe set with capacity for both storing the identified hot shard and over-provisioning a desired amount of buffer space to achieve a desired OP bias, issuing an NVMe command to create the desired OP bias in the identified NVMe set, and moving the identified hot shard to the identified NVMe set. In some embodiments, NVMe sets have been preassigned OP biases, and the step of issuing an NVMe command to create the desired OP bias is not necessary (e.g., when there exists an NVMe set with the desired OP bias and capacity to store the identified hot shard). In some embodiments, the amount of OP bias to be associated with a hot shard is determined using a look-up-table in which OP bias desired is determined according to shard hotness (e.g., as determined by one or more performance metrics, such as QPS). In some embodiments, a plurality of hot shards may be placed together as a single stream in an NVMe set with a higher OP bias. Combining multiple hot shards in a single storage portion (e.g., a single NVMe set) may require a higher OP bias than what would be typically desired when a single hot shard is stored. For example, if a 10 GB NVMe set storing a single hot shard is typically associated with 2 GB of over-provisioned space, storing two or more hot shards in the NVMe set may require over-provisioning more space (e.g., 3 GB, 4 GB, etc.) to achieve a similar level of performance. The amount of OP bias desired may be determined using a look-up table, and an NVMe command may be issued to create the desired amount of over-provisioned space. Multi-stream technology may be used in conjunction with combining storage of multiple hot shards in an NVMe set. In various embodiments, multi-stream technology provides hints to indicate when data writes are associated with one another so that they can be grouped as a stream, which helps to mitigate write amplification. Hence, storing multiple hot shards in an NVMe set in conjunction with using multi-stream technology may result in synergistic mitigation of write amplification.

At 308, it is determined whether cumulative OP bias is less than a specified allowable system OP value. In various embodiments, a cumulative OP bias limit (a configurable parameter) is set for a set of storage portions in order to reduce overall system latency. For example, if an SSD includes 4 NVMe sets that are each 10 GB in size, a cumulative OP bias limit may be set such that no more than 8 GB across the 4 NVMe sets can be over-provisioned. In this example, if 4 GB are over-provisioned for each of the first two NVMe sets, then no further over-provisioning can occur for the other two NVMe sets. As another example, if a server includes 4 SSDs, wherein each SSD includes 4 NVMe sets that are each 10 GB in size, a cumulative OP bias limit may be set such that no more than 32 GB across the 16 NVMe sets can be over-provisioned. Cumulative OP bias is a flexible policy that can be adjusted to balance performance of individual storage portions (e.g., individual NVMe sets) against overall storage system performance. In some embodiments, if a cumulative OP bias limit (a configurable parameter) has been reached, then no further over-provisioning is allowed to occur, meaning that no further association of higher OP biases with identified hot shards can occur. If at 308 it is determined that the cumulative OP bias is less than the specified allowable system OP value, then another hot shard is identified at 302. If at 308 it is determined that the cumulative OP bias is not less that the specified allowable system OP value (and this indicates that no additional hot shards should be identified to be associated with higher OP biases), at 310, the remaining shards are distributed according to a mixing scheme as described below.

Figure 4A:
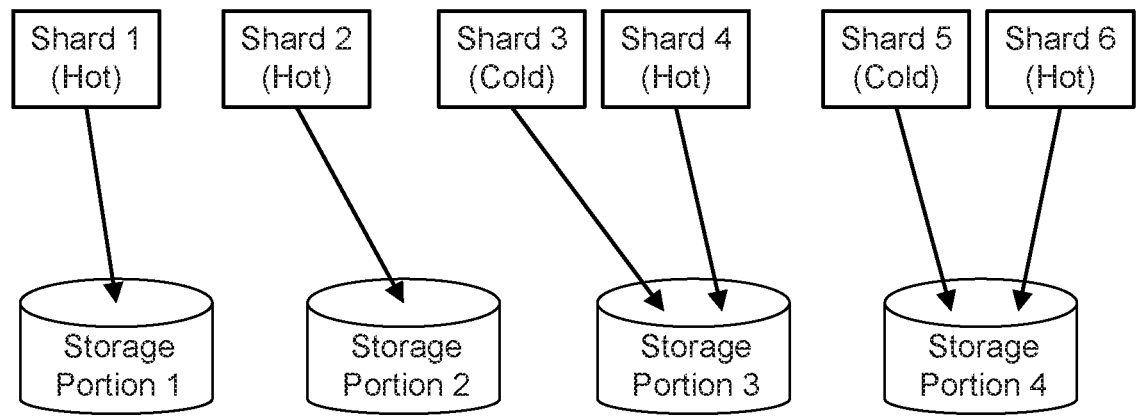
FIGS. 4A and 4B are diagrams illustrating examples of rebalancing shards of different data temperatures.
Figure 4B:
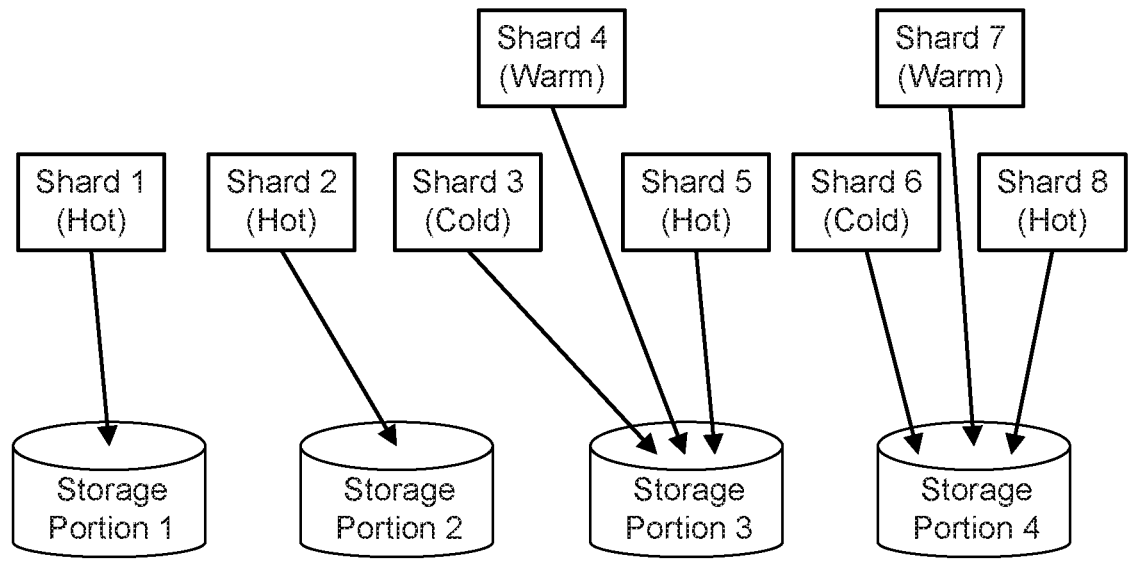

At 310, remaining shards (hot, cold, and otherwise) are mixed within storage. Not included among the remaining shards are shards already associated with higher OP biases (e.g., at step 306). In various embodiments, a goal of such mixing is to evenly distribute data temperatures (and hence access latencies) for the remaining shards in order to achieve more predictable latencies. For example, after identified hot shards have been moved to storage portions with higher OP biases, suppose that a plurality of shards remain (wherein half are hot and half are cold). If all the remaining hot shards are stored with each other and all the remaining cold shards are stored with each other, this storage unaware mixing of remaining shards would result in poor tail latencies due to worst-case latencies driven by the remaining hot shards. Thus, a more sensible mixing strategy could be to evenly distribute placement of remaining hot and cold shards (e.g., pair hot and cold shards together) to mitigate worst-case latencies. FIGS. 4A and 4B provide examples of this mixing strategy.

FIGS. 4A and 4B are diagrams illustrating examples of rebalancing shards of different data temperatures. In the example illustrated in FIG. 4A, hot shards have already been assigned to storage portions 1 and 2. In some embodiments, the hot shards in storage portions 1 and 2 have been identified in the process illustrated in FIG. 3. For example, storage portions 1 and 2 may be NVMe sets that have higher OP biases (more over-provisioned space) and thus had hot shards assigned to them. In the example shown in FIG. 4A, suppose that a cumulative OP bias has been reached after storing shards 1 and 2 in storage portions 1 and 2. In various embodiments, the remaining shards are then mixed within storage (e.g., see 310 of FIG. 3). In the example shown in FIG. 4A, hot and cold shards are distributed evenly across the remaining storage portions (e.g., NVMe sets, SSDs, etc.) such that a hot and a cold shard are stored together in each of storage portion 3 and storage portion 4. In the example illustrated in FIG. 4B, an additional data temperature level is shown. In the example shown in FIG. 4B, suppose again that a cumulative OP bias has been reached after storing shards 1 and 2 in storage portions 1 and 2. The remaining shards are then mixed within storage so as to evenly distribute data temperature (a cold, warm, and hot shard are stored together in each remaining storage portion). In some embodiments, data temperature scores (e.g., ranging from 0 to 10 to denote coldest to hottest) are assigned to remaining shards (e.g., according to one or more performance metrics, such as QPS), and remaining shards are distributed across remaining storage portions such that data temperature scores are evenly distributed across remaining storage portions. By following a multi-tenancy scheme (as illustrated in FIGS. 4A and 4B), the probability of multiple hot shards being stored together is reduced, which improves tail latencies (compared to data temperature unaware mixing) driven by hot shards.

FIG. 5 is a flow chart illustrating an embodiment of a process for associating a higher OP bias with a shard. In some embodiments, the process of FIG. 5 is performed by server 104 of FIG. 1. In some embodiments, at least a portion of the process of FIG. 5 is performed in 306 of FIG. 3. The example shown in FIG. 5 illustrates moving a shard to a storage portion with a higher OP bias (and thus associating the shard with a higher OP bias) by utilizing a compaction mechanism.

At 502, application data associated with a shard is written into memory (e.g., random-access memory (RAM)). For example, an application may be operating on data that is stored in a shard that resides in a storage portion on a server (e.g., server 104 of FIG. 1). The application may need to update the data (e.g., write new data to the shard that is associated with the data). In various embodiments, the application does not write directly to the shard that is associated with the data each time the data is updated by the application; instead, the application first writes to volatile memory, e.g. RAM. The writing of application data to memory (e.g., RAM) is also illustrated as write 602 of FIG. 6.

At 504, it is determined whether space, within memory (e.g., RAM), associated with the shard has reached a specified limit. In various embodiments, space is limited within memory (e.g., RAM) for writing of application data associated with shards. For example, a specific shard may be allocated 2 GB within memory (e.g., RAM). If it is determined that space, within memory (e.g., RAM), associated with the shard has not reached the specified limit, then subsequent application data associated with the shard will continue to be written into memory (e.g., RAM) at 502. On the other hand, if it is determined that space, within memory (e.g., RAM), associated with the shard has reached the specified limit, at 506, a flush of application data occurs.

At 506, application data associated with the shard is flushed as a file into a storage portion based on one or more performance metrics associated with the shard. In various embodiments, when space within memory (e.g., RAM) allocated for writing data associated with the shard has reached a limit, all of the application data associated with the shard is flushed from memory (e.g., RAM) into non-volatile storage (e.g., FLASH memory storage on a server, such as server 104 of FIG. 1) in the form of a new file created in the storage portion. Flushing frees the space in memory (e.g., RAM) that was occupied by the flushed data so that new data can be stored in memory (e.g., RAM). The storage portion in which the file is created may depend on one or more performance metrics (e.g., QPS) associated with the shard.

If the one or more performance metrics indicate the shard was cold but is now hot, then the file may be created in a storage portion associated with a higher OP bias. If it had already been determined that the shard was hot and application data associated with the shard was already being flushed as files into a storage portion associated with a higher OP bias, then the file would be created in the same storage portion where previous files associated with the shard were created. If the one or more performance metrics indicate that the shard was cold and is still cold, then the file would be created in the same storage portion where previous files associated with the shard were created. FIG. 6 illustrates flushing of application data as a file into a storage portion. In the example shown in FIG. 6, flush 606 results in file 10 being created to store data associated with shard A. File 10 is created in storage portion 2, which, in this example, would have a higher OP bias. In the example shown in FIG. 6, shard A was initially designated as cold, and as such, files associated with shard A would have been initially stored in storage portion 1, which would have a lower OP bias. In the example shown in FIG. 6, after file 8 was written into storage portion 1, shard A would have been designated as hot (according to one or more performance metrics, such as QPS) and subsequent files associated with shard A would have been written into a storage portion with a higher OP bias (e.g., storage portion 2). FIG. 6 illustrates a scenario of data associated with a shard split between multiple storage portions (e.g., split between multiple NVMe sets and/or SSDs) due to the shard initially being designated as cold and then designated as hot.

At 508, it is determined whether the number of files in the shard has reached a compaction threshold (a configurable parameter). In some embodiments, the storage system storing the shard (e.g., a storage system of which server 104 of FIG. 1 is a part) will consolidate files belonging to a shard if the number of files belonging to the shard reaches a specified threshold. This consolidation mechanism is referred to as compaction. If it is determined that the number of files in the shard has reached the compaction threshold, the files in the shard will be consolidated at 510. If it is determined that the number of files in the shard has not reached the compaction threshold, processing of application data associated with the shard continues as described above starting at 502 (e.g., writing application data into memory (e.g., RAM) and subsequently flushing into a storage portion).

At 510, files in the shard are consolidated by combining them into a new combined file to be stored in a storage portion that was most recently written to for the shard. For example, if the files associated with the shard have all been written to a single storage portion (e.g., due to the shard having never changed from a cold to hot designation), then the new combined file would be created in the storage portion where the files associated with the shard had been written. In the example illustrated in FIG. 6, consolidation 610 shows a combination of files of shard A from storage portion 1 and storage portion 2 into a new file within storage portion 2, which is the storage portion most recently written to (in the form of file 10). The example of FIG. 6 shows consolidation of files belonging to a shard when the number of files belonging to the shard reaches a threshold of 10 files (compaction threshold of 10 files). Other compaction thresholds are also possible. In various embodiments, when compaction occurs, the original files from which the new combined file is created are deleted after the creation of the new combined file. As described above, files associated with shard A in FIG. 6 are stored in multiple storage portions due to shard A's designation changing from cold to hot. The examples illustrated in FIGS. 5 and 6 show that all files associated with a shard do not need to be immediately moved to a storage portion with a higher OP bias when the shard is designated as a hot shard. Consolidation of files associated with a hot shard may occur in the background utilizing a compaction mechanism.

The foregoing example illustrating moving a shard to a storage portion with a higher OP bias via a compaction mechanism is illustrative and not restrictive. There are many alternative implementations for associating shards with higher OP biases and/or moving shards. For example, when a compaction mechanism is not available, storage aware shard rebalancer 110 of FIG. 1 may periodically move files associated with a hot shard to a storage portion with a higher OP bias. When a compaction mechanism is not utilized, extra writes may be needed to move files associated with a hot shard to a storage portion with a higher OP bias. In some embodiments, as described above with respect to 306 of FIG. 3, the OP bias of the storage portion in which a newly designated hot shard resides can be dynamically increased (e.g., via issuing an NVMe command) without moving the files associated with the hot shard.

FIG. 6 is a diagram visually illustrating an example of an embodiment described with respect to the process of FIG. 5. As described above with respect to FIG. 5, files associated with a hot shard may be moved to a storage portion with a higher OP bias by utilizing a compaction mechanism that combines files comprising application data flushed to storage portions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
monitoring a performance metric of a data shard including a plurality of files stored in a first storage portion;
determining that the performance metric of the data shard including the plurality of files exceeds a threshold;
in response to at least the determination that the performance metric exceeds the threshold, increasing the over-provisioning bias of a first storage portion storing a plurality of data shards each storing a plurality of files; and
in response to a determination that a cumulative value the over-provisioning bias associated with an amount of buffer space allocated to the first storage portion meets a cumulative over-provisioning bias limit, rebalancing the plurality of data shards of the first storage portion including by reassigning the data shard to a second storage portion selected based on an over-provisioning bias of the second storage portion that is different than the over-provisioning bias of the first storage portion.

2. The method of claim 1, wherein the performance metric that is monitored is associated with a frequency of access of the data shard over a specified period of time.

3. The method of claim 1, wherein the performance metric that is monitored includes one or more of the following: read queries per unit of time, write queries per unit of time, read bandwidth, write bandwidth, read latency, or write latency.

4. The method of claim 1, wherein at least one of the first storage portion and the second storage portion is a solid-state drive or a portion of a solid-state drive.

5. The method of claim 1, wherein at least one of the first storage portion and the second storage portion is a Non-Volatile Memory Express set.

6. The method of claim 1, wherein determining that the performance metric of the data shard exceeds the threshold includes determining that a number of times the data shard has been accessed during a specified period of time is greater than or equal to a specified value.

7. The method of claim 1, wherein the data shard was reassigned to the second storage portion based on a determination that a specified limit on how many data shards for which the performance metric exceeds the threshold can be reassigned has not been reached.

8. The method of claim 1, wherein the data shard was reassigned to the second storage portion based on a determination that a cumulative over-provisioning bias limit with respect to a collection of storage portions, of which the first storage portion and the second storage portion are a part, has not been reached.

9. The method of claim 1, wherein reassigning the data shard to the second storage portion includes issuing a Non-Volatile Memory Express command.

10. The method of claim 1, wherein the over-provisioning bias of the second storage portion is higher than the over-provisioning bias of the first storage portion.

11. The method of claim 1, further comprising:
determining that the performance metric as applied to each of a plurality of additional data shards exceeds the threshold; and
separating the plurality of additional data shards within a storage system.

12. The method of claim 11, wherein separating the plurality of additional data shards within the storage system includes assigning the plurality of additional data shards to different storage portions such that the different storage portions are accessed at a substantially similar frequency.

13. The method of claim 11, wherein separating the plurality of additional data shards within the storage system includes mixing the plurality of additional data shards with another plurality of data shards for which the performance metric does not exceed the threshold for each member of that plurality of data shards.

14. The method of claim 1, wherein the data shard includes data flushed from a volatile memory source.

15. The method of claim 1, wherein the second storage portion includes one or more other data shards for which the performance metric exceeds the threshold that form a stream with the data shard.

16. The method of claim 1, wherein reassigning the data shard to the second storage portion includes copying the plurality of files comprising the data shard to the second storage portion and deleting the copied plurality of files comprising the data shard from the first storage portion.

17. The method of claim 1, wherein at least one file in the plurality of files comprising the data shard is combined with another file to form a new file in the second storage portion.

18. The method of claim 17, wherein the another file did not reside in the first storage portion.

19. A system comprising:
a processor configured to:
monitor a performance metric of a data shard including a plurality of files stored in a first storage portion;
determine that the performance metric of the data shard including the plurality of files exceeds a threshold;
in response to at least the determination that the performance metric exceeds the threshold, increase the over-provisioning bias of a first storage portion storing a plurality of data shards each storing a plurality of files; and
in response to a determination that a cumulative value the over-provisioning bias associated with an amount of buffer space allocated to the first storage portion meets a cumulative over-provisioning bias limit, rebalance the plurality of data shards of the first storage portion including by reassigning the data shard to a second storage portion selected based on an over-provisioning bias of the second storage portion that is different than the over-provisioning bias of the first storage portion; and
a memory coupled to the processor and configured to provide the processor with instructions.

20. A computer program product, the computer program product being embodied in a non-transitory computer readable storage medium and comprising computer instructions for:
monitoring a performance metric of a data shard including a plurality of files stored in a first storage portion;
determining that the performance metric of the data shard including the plurality of files exceeds a threshold; and
in response to at least the determination that the performance metric exceeds the threshold, increasing the over-provisioning bias of a first storage portion storing a plurality of data shards each storing a plurality of files; and
in response to a determination that a cumulative value the over-provisioning bias associated with an amount of buffer space allocated to the first storage portion meets a cumulative over-provisioning bias limit, rebalancing the plurality of data shards of the first storage portion including by reassigning the data shard to a second storage portion selected based on an over-provisioning bias of the second storage portion that is different than the over-provisioning bias of the first storage portion.

* * * * *